Aug. 19, 1952

C. P. BERGMAN 2,607,640

BEARING FOR FLUID METERS

Filed Nov. 10, 1945

INVENTOR.
CHARLES P. BERGMAN, deceased
by WILLIAM V. ELLIOTT, administrator
BY

Strauch & Hoffman

ATTORNEYS

Aug. 19, 1952
C. P. BERGMAN
2,607,640
BEARING FOR FLUID METERS
Filed Nov. 10, 1945
4 Sheets-Sheet 2
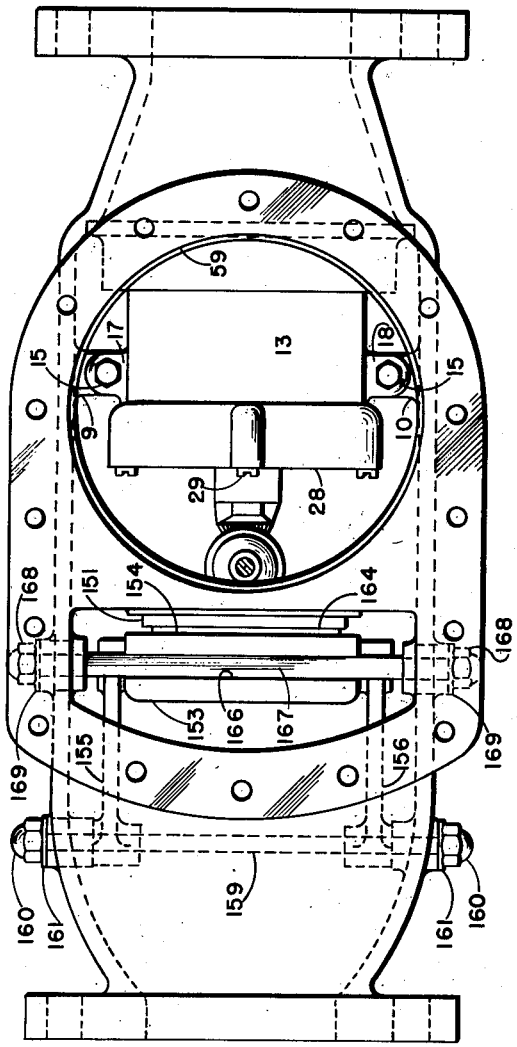
FIG. 2
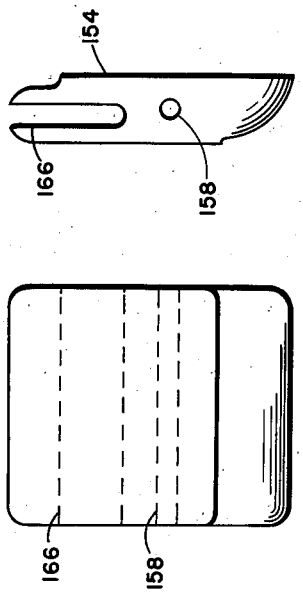
FIG. 4
FIG. 3
INVENTOR.
CHARLES P. BERGMAN, deceased,
by WILLIAM V. ELLIOTT, administrator
BY
*Strauch & Hoffman*
ATTORNEYS Aug. 19, 1952 C. P. BERGMAN 2,607,640
BEARING FOR FLUID METERS
Filed Nov. 10, 1945 4 Sheets-Sheet 4

INVENTOR.
CHARLES P. BERGMAN, deceased.
by WILLIAM V. ELLIOTT, administrator
BY
Strauch & Hoffman
ATTORNEYS Patented Aug. 19, 1952

2,607,640

UNITED STATES PATENT OFFICE 2,607,640

BEARING FOR FLUID METERS

Charles P. Bergman, deceased, late of Brooklyn, N. Y., by William V. Elliott, administrator, Brooklyn, N. Y., assignor to Rockwell Manufacturing Company, a corporation of Pennsylvania Application November 10, 1945, Serial No. 627,810

4 Claims. (Cl. 308—217)

1

The present invention relates to meters for the measurement of fluid, and relates particularly to the type of meters known as compound meters wherein a small meter is employed for measuring small flows, and a large meter is employed for measuring large flows beyond the capacity of the small meter.

It is an object of the present invention to provide a compound meter in which there is provided a large flow meter and a small flow meter in series, with a valve controlled bypass around the small flow meter, so that the flow at all times passes through the large flow meter.

Another object is the provision in a compound meter having a large flow meter and a small flow meter in series, of a valve located on the down stream side of the high rate of flow meter and controlling the flow therethrough, and a common register provided to be driven by a suitable clutch drive so that the faster moving meter drives the register.

A further object is the provision in a compound meter, of a valve which is moved completely out of the path of the measured fluid passing through said large meter when the valve is fully opened.

A further object is the provision of a large volume measuring meter supported in roller bearings of hard rubber on a horizontal axis in the line of flow.

A further object is the provision of a compound meter in which the working parts are so arranged as to be readily removable from the housing without removing the housing from the line in which it is connected.

A further object is the provision of a compound meter in which the accuracy at the change over point is not impaired.

A further object is the provision of a compound meter having a valve which moves out of the path of fluid passing through the large meter so as to reduce the loss of head in the meter.

A further object is the provision in a compound meter of a valve which is opened by a gradually decreasing force.

Another object is the provision of a compound meter which is of simple construction, is compact and of lesser weight than those heretofore constructed, and which has an increased flow capacity.

In accordance with the present invention, a compound meter having a large flow meter is provided and a small flow meter in series therewith, a valve on the down stream side of the large flow meter which controls a bypass and opens when a predetermined rate of flow is attained so as to allow substantially the full volume to be measured by the large flow measuring device. This valve is preferably of a type which may move substantially completely out of the stream of fluid through the large flow meter and thus does

2 not obstruct flow therethrough. The valve is arranged so that in closed position a greater force is required to open the valve than after the valve is slightly cracked, and the force necessary to further open the valve decreases as the valve opening increases. In this arrangement a single register is driven through a suitable one way drive arrangement by either the large flow meter or the small flow meter, whichever is moving faster.

The invention will be described in greater detail in connection with the accompanying drawings wherein is illustrated a preferred embodiment of the invention by way of example, and wherein:

Figure 2 is a top view of the meter with the top cover and small meter removed;

Figure 3 is an elevation of the valve as viewed from the left in Figure 1;

Figure 4 is a side view thereof;

Figure 1:
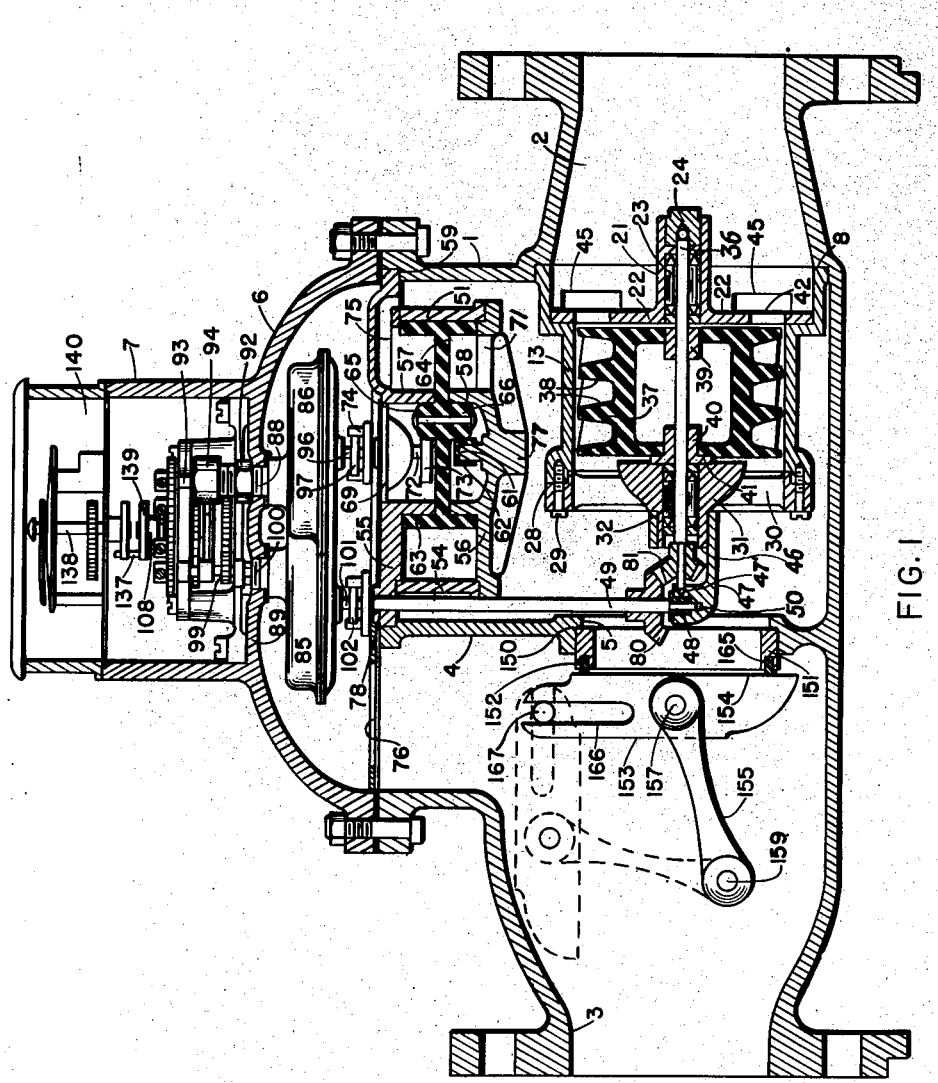
Figure 1 is a vertical section through the meter with certain parts illustrated in elevation.

Referring to the drawing there is shown a casing comprising a lower part 1 having an inlet passageway 2, an outlet passageway 3, and a dividing wall 4 therebetween having an orifice 5 therein, and a cover 6 for the casing having an extension 7. The body has an internal shoulder 8 surrounding the inlet 2 and suitably apertured lugs 9 and 10 (Fig. 2) extend from the interior of the casing. A cylindrical impeller housing 13 is located in the casing 1 with one end seated on the shoulder 8, and is held in position by bolts 15 extending through apertured lugs 17 and 18 on the outside of the housing 13, and threaded into the lugs 9 and 10. The impeller housing has an end wall 22 provided with a central hub 21, the hub being bored to receive a roller bearing unit 23 of suitable construction, and which bore has its outer end closed by a plug 24 having a pressed fit. The opposite end of the impeller housing has a cylindrical extension 28 secured thereto in any suitable manner, as by screws 29, and has ribs or spokes 30 rounded on the forward edge and which carry a hub 31, that is bored to receive a suitable roller bearing 32.

Figures 7, 8:
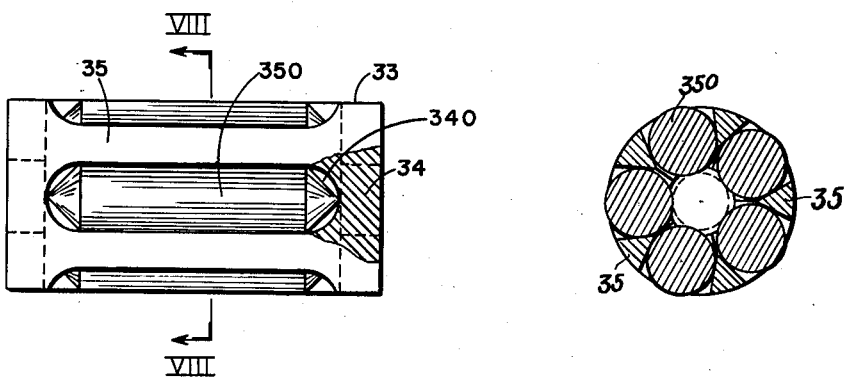
Figure 7 is a side elevation partly in section of one form of roller bearing unit for the impeller shaft.
Figure 8 is a sectional view taken substantially on line VIII—VIII of Figure 7.
Figure 9:
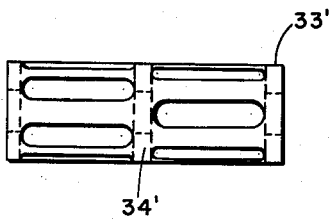
Figure 9 is a view similar to Figure 7 showing a modified form of the bearing unit.

The roller bearings 23 and 32 are preferably of the cage type as shown in Figures 7 or 9 of the drawings. As seen in Figure 7, the roller cage 33 has end walls 34 connected by spaced longitudinally extending webs 35 of triangular form in cross-section. Bearing rollers 35a of hard rubber are rotatably disposed between the spaced webs 35 and have conical end portions 34a opposed to the end walls 34 of the cage. The rubber rollers 35a provide elongated anti-friction bearings in which the shaft 36 is journalled. This shaft carries the impeller 37 of the large flow meter.

As seen in Figures 1 and 8 of the drawings the hard rubber rollers of the bearing unit are of greater diameter than the shaft 36, and therefore of relatively large surface area to reduce wear to a minimum with the use of a comparatively small number of rollers. Thus a very rugged roller and cage construction is provided, and it has been found by test that hard rubber is the only non-metallic material having the requisite wear resistant properties and resistance to swelling when submerged in water or other liquids.

It will also be seen that by the provision of the conical ends 34a on the bearing rollers, in inserting the cage at either end thereof over the end of shaft 36, the latter will engage the conical surfaces of the rollers and urge the same outwardly between the spaced webs 35 of the cage to their operative positions for single point axial thrust contact of the conical roller ends against the internal surfaces of the end walls 34 of the cage.

In Figure 9 of the drawings an alternative form of the roller bearing unit is illustrated, in which the cage 33' has a centrally located wall 34' and two sets of relatively short hard rubber rollers of substantially the same form as those shown in Figure 7 are adapted to be mounted in the cage at relatively opposite sides of the wall 34', with the rollers in one set disposed in staggered relation to the rollers in the other set.

The impeller is of hollow construction and has on its exterior the helical vanes 38. An enlargement 39 on the impeller shaft is received in a suitable centering bore in the forward impeller end, and a similar enlargement 40 at the opposite end is received in a similar bore in the rear impeller head, the shaft being secured to the impeller by screws (not shown) passing through flange 41 into the impeller head. A suitable clearance is provided between the rear of the impeller and the rear spokes 30 to prevent a suction effect. The housing wall 22 is provided with the straightening vanes 45 which are designed to direct incoming fluid at a uniform angle through apertures 42 against the helical vanes 38. The hub 31 has a reduced portion 46 which receives a collar 47 suitably locked against rotation as by a set screw, and having an extension with a horizontal bore therein to receive the end of shaft 36 and a ball 47' therein takes the end thrust of the shaft. This member also has a vertical bushed bore 48 which receives a shaft 49 and a ball 50 takes the end thrust of the latter shaft.

Within the upper portion of housing 1 is mounted a positive type measuring member 51, there being a relatively large space below the meter to reduce the velocity of the fluid. This measuring member preferably is of the oscillating piston type, and comprises a chamber formed by a middle cylindrical portion 54 and cover plates 55 and 56 having cylindrical extensions 57 and 58 about their centers, the top plate being received by a shoulder 59 in the casing, and the cover 6 holds the measuring member in place. The lower cover has a middle boss 61 receiving a thrust roller 62 and a piston is located in the chamber and comprises a cylinder 63 having a middle slotted membrane 64 and stems 65 and 66 secured at its center; the lower stem 66 being engaged by the roller 62 is guided thereby for oscillation in the chamber, a suitable division plate being provided. A central bearing and sealing member 69 is suitably secured and sealed in the top plate of the measuring chamber and contains a bearing in which is journalled a stem 72 carrying the dog 73 at its bottom which is engaged and driven by the upper stem 65, and stem 72 has a crank member 74 at its top. Fluid enters the meter 51 through a suitable inlet opening 71 in the bottom plate 56, and a shielded inlet opening 75 provided in the top plate 55. At the opposite side of the division plate (not shown) with respect to inlet openings 71 and 75, the top plate 55 is provided with an outlet opening whereby fluid enters cover 6 after it is measured and passes to the outlet through one or more openings 76 in the bottom plate of the cover which may be used to limit the rate of flow through the meter 51. A post 77 reenforces the cover plate 56. This metering unit is further disclosed in detail in the Whittaker Patent No. 2,338,152, January 4, 1944. The size or area of the opening 76, by controlling the rate of flow through meter 51, governs the differential pressures which in turn control the operation of the valve to be presently described.

The upper head 55 of the measuring chamber has a bore 78 outside of the measuring chamber of meter 51 in which is journalled the upper end of shaft 49. This shaft carries a miter gear 80 which meshes with a miter gear 81 on the impeller shaft 36.

Within the cover member 6 at the top is located reduction gear housings 85 and 86. Housing 86 has a threaded extension 88 passing through the bottom 89 of the register drive compartment 7 and is held in place by a lock nut 92 threaded thereon. This extension serves as a stuffing box through which extends the last spindle 93 of the gear train and which is sealed by suitable stuffing compressed by gland 94. The first spindle 96 of the gear train carries a dog 97 which is engaged and driven by crank member 74. The housing 85 is similarly secured in place with its final spindle 99 passing through a stuffing box 100 and its first spindle 101 suitably coupled to shaft 49 by a self-aligning separable coupling 102 of suitable construction.

Figure 6:
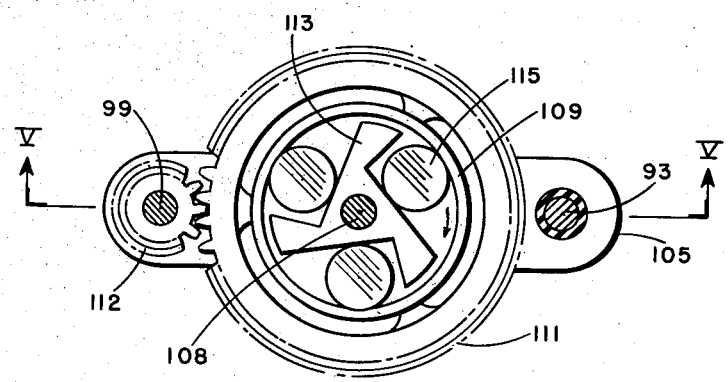
Figure 6 is a horizontal sectional view taken substantially on line VI—VI of Figure 5.
Figure 5:
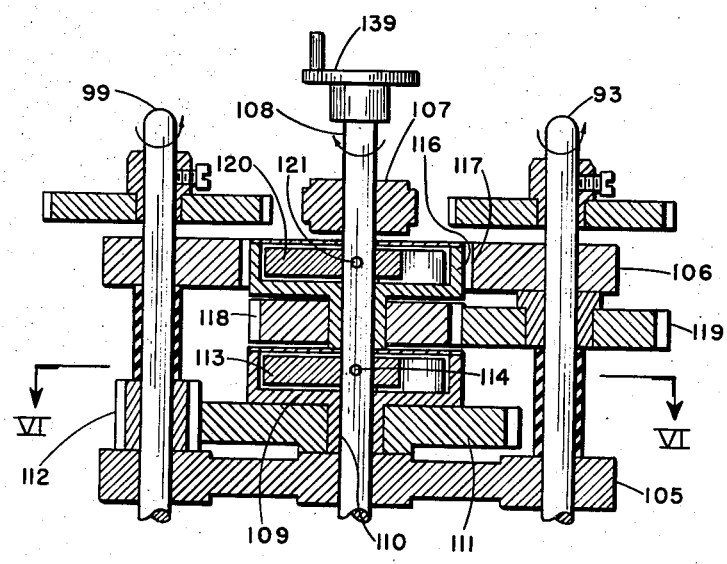
Figure 5 is a detail vertical section on line V—V of Figure 6 illustrating a preferred embodiment of the register driving unit.

The means for translating the operation of the two metering devices into units of measurement with the use of a common register includes a coordinator, shown more particularly in Figures 5 and 6 of the drawings. This register driving unit includes a frame having rigidly connected vertically spaced plates 105 and 106 suitably mounted in the extension 7 of the housing or casing cover 6. In these frame plates, the spindles 93 and 99 are journalled. The upper plate 106 carries a centrally located bearing 107 for the register driving shaft or spindle 108 which is journalled at its lower end in the frame plate 105.

The housing 109 of a one-way clutch has a hub portion 110 loosely surrounding the lower end of the shaft 108 and is keyed or pinned to gear 111 in mesh with the pinion 112 fixed to the shaft or spindle 99. The multiple armed clutch dog 113 is pinned to the driving shaft 108, as indicated at 114, within the housing 109 and provides a plurality of pockets for the clutch rollers 115. Thus in the rotation of the housing 109 in the direction indicated by the arrow in Figure 6, said rollers coact with the dog 113 to transmit rotation from the spindle 99 connected with the large flow meter, to the shaft or spindle 108.

A second clutch housing 116 rotates within an opening 117 in the top frame plate 106 and has a hub portion loosely surrounding the shaft 108 and keyed or pinned to the gear 118 in mesh with the gear 119 fixed to the spindle 93. Within the housing 116 the clutch dog 120 is pinned to the shaft 108 as at 121 and is of similar form to the dog 113 to be engaged by clutch rollers within the housing, whereby rotation will be transmitted to the drive shaft 108 from spindle 93 connected to the small flow meter, independently of the clutch housing 109. It will thus be understood that the shaft 108 will be driven by the clutch housings 109 and 116 depending upon which one of said housings is rotating at the higher speed.

The register device 140, suitably mounted upon the cover extension 7, includes a vertical shaft 138 having a dog 137 on its lower end engaged with an arm 139 suitably fixed to the upper end of the shaft 108.

The operation of the apparatus so far described will now be explained. Fluid entering the inlet 2 is directed by the straightening vanes 45 against the helical vanes 38 of the impeller to rotate the impeller member 37, this rotation being transmitted by shaft 36, miter gears 81 and 80 to shaft 49, and through coupling member 102 and through the gear train in casing 85 to the spindle 99. Fluid that passes the impeller 37 passes upward through the positive meter 51 and discharges from the exit opening (not shown) into the cover member 6 and continues through opening 76 to the outlet side of the housing, and in doing so oscillates the piston in the meter whereby stem 65 rotates shaft 72, which through the coupling 74, 97 operates the gear train in housing 86 to drive the spindle 93. It is assumed that the orifice 5 is closed and thus all the flow passes through the chamber 13 and the positive meter 51. Assuming the amount of flow is so small that the rotation of impeller 37 will not bear an accurate relationship thereto, the meter 51 will accurately measure the flow therethrough, and the register driving shaft 138 will be driven by the faster moving clutch housing 116, the gearing relationship between the two metering elements being suitably selected for this purpose.

The opening 5 provides an internal shoulder or step 150 to receive a flanged seat member 151 having a circular insert 152, of suitable material such as "neoprene," to form a seat. A valve member 153, in the form of a rectangular plate accurately machined on its interior face 154, is adapted to engage the seat 152 and is held in position by arms 155 and 156 secured to the ends of a spindle 157 passing through a suitable bore in the valve member, and at their opposite ends the arms are journalled on a spindle 159 passing through the housing and held in position by nuts 160 and sealing washers 161 (Figure 2). The valve member may be inserted from the top of the casing. The center of spindle 157 preferably coincides substantially with the horizontal axis of the bore 165 in the valve seat member 151 or its slightly above, and the arms 155 and 156 are of greater length than the horizontal projected distance between the shafts 157 and 159 when the valve is in closed position. The center of shaft 157 preferably is forward of a median plane parallel to the side faces of the valve member. Thus the weight of the valve develops a horizontal force component causing the arms 155 and 156 to constantly urge the valve member to its seat, the seating pressure of the valve being augmented by having the greater portion of the valve mass above shaft 157. The "neoprene" insert 152 projects beyond the end face 164 of the seat member 151 to eliminate metal to metal contact between the valve 153 and said seat member. The small area of contact between the valve and insert 152 avoids the possibility of a retarded opening of the valve with a small clearance between the valve and member 151 which would result in a high velocity of flow with a suction effect, tending to cause chatter and delayed opening of the valve.

The upper end of the valve member has a slot 166 which receives a guide spindle 167 extending through the casing and held in place by nuts 168 and sealing washers 169. This spindle 167 and guide slot 166 are arranged so that arms 155 and 156 may hold the valve against its seat, the required play being provided between spindle 167 and slot 166 to allow proper seating of the valve. The distance between shafts 159 and 167 is greater than the distance between shafts 159 and 157, and when the pressure of incoming fluid is sufficient to slightly open the valve, arms 155 and 156 commence to rotate about their pivot 159 as indicated by the dot and dash line, to pivot valve member 153 about shaft 167 as a sliding pivot to open the valve slightly. In effect the valve member mounting provides a toggle biased by the weight of the valve, and after the pivot points 159, 157, and 167 pass through the alignment position, which is approximately 45° from the vertical, a progressively decreasing force is required to further open the valve. This is due to the fact that the moment of the weight of the valve relative to the moment of the applied force is constantly changing owing to the unbalanced mounting of the valve between the arms 155 and 156 and its sliding pivotal support at 167. When the valve reaches the fully open position the housing 1 acts as a stop by engaging the corners of the valve, and it is substantially horizontal and will not interfere with the flow of fluid from orifice 5 to the outlet 3.

The operation of the complete apparatus now will be described. Assuming a small flow of liquid, the valve 153 will be in closed position, and all the liquid will pass through the impeller 37 to rotate it, and will pass upwardly through the positive meter 51 to oscillate the impeller or piston thereof and clutch housing 116 will drive the register. The impeller 37 and shaft 49 will not drive the register because the clutch housing 109 driven thereby is moving at a slower rate of speed than clutch housing 116. When the flow increases in volume to the extent that the impeller 37 can accurately measure the flow, and the flow is still below the maximum capacity of the positive meter 51, the clutch housings 109 and 116 will be driven at substantially the same speed and the register then may be regarded as being driven by both meters, although if there is a slight difference in accuracy of measurement between the two meters, the faster moving clutch housing will drive the register. If the flow still further increases the valve 153 will be opened to allow the liquid to flow directly to outlet 3. This movement of valve 153 occurs when the rate of flow is such that impeller 37 will accurately measure the flow, and that part of the flow which passes through the positive meter 51 will not affect the accuracy of registration because all the liquid flows through the impeller 37 before it enters the meter 51. The force required to move valve 153 from closed position is the liquid pressure head of predetermined value. Thereafter, the changing lever arm and the weight of the valve above pivot 167 assists in opening the valve further, and after the aligned pivot position is reached it requires only a comparatively slight fluid pressure to move the valve to substantially horizontal position where it will not obstruct the flow between the inlet and outlet.

It will be noticed that at the changeover point where the positive meter 51 ceases to measure the full flow, there is no change in accuracy because the full flow always passes through the impeller 37 and once the flow has reached that rate where impeller 37 will accurately measure it, there is considerable leeway for timing the opening of valve 153, because there is an overlap of the accurate capacities of the positive meter 51 and the impeller 37. There is thus provided a compact structure in which the low volume and high volume meters are combined in a single housing connected into the flow line so that all the parts may readily be removed without taking the casing out of the flow line, and the loss of head through the meter is decreased. The impeller is mounted in hard rubber roller bearings which are lubricated by the liquid being measured and as the impeller axis is in horizontal position no change in the direction of flow of the liquid in the housing is required until after the liquid has passed through the impeller.

The mounting and arrangement of the large and small meters with the register drive mechanism in closely superposed relation is a very important practical feature of the invention. With the small flow meter unit directly above the large flow unit, a common housing structure of simple design can be utilized, providing a very compact assembly of minimum size and weight. This results in economical use of materials with maximum ease and facility of installation. It also directly contributes to a greatly simplified connection between the meter units and the registering mechanism involving only the use of a single set of beveled gears, materially simplifies the internal passageways to allow free flow of the liquid through the meters with minimum restriction, and facilitates rapid production with a corresponding reduction in cost.

The subject matter of this application is a continuation-in-part of a pending application for patent on Compound Meter, filed November 4, 1943, Serial No. 508,888, now United States Letters Patent No. 2,425,720 issued August 19, 1947.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An anti-friction bearing assembly for a water actuated rotor coaxially mounted in a water conduit, said assembly comprising a cage member having opposite end walls connected by circumferentially spaced longitudinal webs, hard rubber shaft bearing rollers between said webs of greater diameter than the shaft supported thereby, said end walls of the cage each being provided with an axially centered shaft receiving opening and having a major diameter providing clearance with an outer bearing race to permit free axial flow of water into the cage between and in contact with the bearing rollers.

2. In a water meter assembly, a substantially horizontal water actuated meter rotor having a shaft and driven by the metered water, an anti-friction bearing assembly therefor adapted to be lubricated by the metered water comprising a plurality of hard rubber bearing rollers arranged between the rotor shaft and an outer bearing race, and means retaining said rollers in circumferentially spaced relation for individual relative rotation, said means including relatively rigid parts at opposite ends of the rollers permitting entrance of the water therethrough for distribution along the shaft and rollers.

3. In a water meter assembly, a substantially horizontal fluid meter rotor driven by the water to be metered and having aligned shafts projecting from opposite ends, and a bearing assembly for supporting each shaft comprising a cage containing a plurality of hard rubber rollers maintained in circumferentially spaced positions about the shaft, said cage, shaft and rollers having associated relative clearances permitting the entrance and distribution of water being metered for lubricating the bearing assembly.

4. In a water meter assembly, a substantially horizontal water actuated meter rotor having a shaft and driven by the metered water, an anti-friction bearing assembly therefor comprising a plurality of hard rubber bearing rollers arranged between the rotor shaft and an outer bearing race, said rollers being pointed at their opposite ends, a cage for maintaining said rollers in circumferentially spaced positions about said shaft comprising end parts having centered shaft receiving openings, webs of substantially triangular section extending between said parts and adapted to engage said rollers, said webs terminating at their inner edge in a line substantially parallel with said shaft and displaced a substantial distance therefrom, said webs joining said end parts in radially extending arcuate sections adapted to engage the pointed ends of said rollers for guiding said rollers for limited bodily movement to and away from said shaft while preventing longitudinal displacement of said rollers.

WILLIAM V. ELLIOTT,
*Administrator of the Estate of Charles B. Bergman, Deceased.*

REFERENCES CITED

The following references are of record in the file of this patent:

UNITED STATES PATENTS

| Number | Name | Date |
|---|---|---|
| 394,312 | Tanner | Dec. 11, 1888 |
| 592,053 | Hunt | Oct. 19, 1897 |
| 771,826 | Lohse | Oct. 11, 1904 |
| 934,504 | Connet | Sept. 21, 1909 |
| 997,573 | Michaud | July 11, 1911 |
| 1,457,932 | Olsen | June 5, 1923 |
| 1,646,624 | McKenna | Oct. 25, 1927 |
| 2,270,141 | Potter | Jan. 13, 1942 |
| 2,406,069 | Freeman | Aug. 20, 1946 |

FOREIGN PATENTS

| Number | Country | Date |
|---|---|---|
| 531,211 | France | Jan. 9, 1922 |